(12) United States Patent
Boysen et al.

(10) Patent No.: US 10,019,605 B2
(45) Date of Patent: Jul. 10, 2018

(54) SYSTEMS, METHODS AND APPARATUS FOR SECURE PERIPHERAL COMMUNICATION

(71) Applicant: Square, Inc., San Francisco, CA (US)

(72) Inventors: Andre Boysen, Huntsville (CA); Dmitry Barinov, Maple (CA); Eli Erlikhman, Toronto (CA)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/752,625

(22) Filed: Jun. 26, 2015

(65) Prior Publication Data

US 2016/0292460 A1 Oct. 6, 2016

Related U.S. Application Data

(60) Provisional application No. 62/140,004, filed on Mar. 30, 2015.

(51) Int. Cl.
| | |
|---|---|
| *G06F 21/83* | (2013.01) |
| *G06F 21/31* | (2013.01) |
| *G06F 21/60* | (2013.01) |
| *G06F 21/74* | (2013.01) |
| *G06F 21/85* | (2013.01) |

(52) U.S. Cl.
CPC .............. *G06F 21/83* (2013.01); *G06F 21/31* (2013.01); *G06F 21/60* (2013.01); *G06F 21/602* (2013.01); *G06F 21/74* (2013.01); *G06F 21/85* (2013.01); *G06F 2221/2107* (2013.01)

(58) Field of Classification Search
CPC ......... G06F 21/10; G06F 21/74; H04L 63/10; H04L 63/0428

USPC .......................................................... 726/26
See application file for complete search history.

(56) References Cited

U.S. PATENT DOCUMENTS

| | | | |
|---|---|---|---|
| 2006/0195907 A1* | 8/2006 | Delfs ....................... G06F 21/74 726/26 |
| 2013/0016832 A1* | 1/2013 | Yamashita ............ G06F 21/606 380/44 |
| 2014/0080444 A1* | 3/2014 | Mosse ................... H04L 41/082 455/410 |
| 2014/0108791 A1 | 4/2014 | Sinclair et al. |
| 2014/0250491 A1 | 9/2014 | Fleischman et al. |

(Continued)

FOREIGN PATENT DOCUMENTS

WO 2016/160566 A1 10/2016

OTHER PUBLICATIONS

Riboni, "Obfuscation of Sensitive Data for Incremental Release of Network Flows", Apr. 2015, IEEE, vol. 23, pp. 672-686.*

(Continued)

*Primary Examiner* — Jason Lee
*Assistant Examiner* — Gregory Lane
(74) *Attorney, Agent, or Firm* — Maynard Cooper & Gale, P.C; Brian T. Sattizahn, Esq.

(57) ABSTRACT

An interface device includes a communication interface and a secure element. The communication interface receives input data and a selection of one of a plurality of secure modes to secure the input data for transmission to a secure external computing device, such as a banking web server. The secure element secures the input data based on the secure mode that was selected. The secured input data is then transmitted to the secure external computing device.

23 Claims, 8 Drawing Sheets

(56) References Cited

U.S. PATENT DOCUMENTS

| | | | | |
|---|---|---|---|---|
| 2014/0317686 A1* | 10/2014 | Vetillard | ............... | G06F 21/74 |
| | | | | 726/2 |
| 2014/0365372 A1 | 12/2014 | Ross et al. | | |
| 2015/0089586 A1* | 3/2015 | Ballesteros | ........... | H04W 12/08 |
| | | | | 726/3 |
| 2015/0128252 A1* | 5/2015 | Konami | ............... | H04L 63/107 |
| | | | | 726/17 |
| 2015/0215337 A1* | 7/2015 | Warren | ................. | H04L 63/20 |
| | | | | 726/26 |
| 2016/0173652 A1* | 6/2016 | Chai | .................... | H04W 4/008 |
| | | | | 709/230 |

OTHER PUBLICATIONS

International Search Report and Written Opinion for PCT Application No. PCT/US2016/024203 dated Jun. 20, 2016.

* cited by examiner

SYSTEMS, METHODS AND APPARATUS FOR SECURE PERIPHERAL COMMUNICATION

CROSS-REFERENCE TO RELATED APPLICATIONS

The present application claims priority from U.S. Provisional Application 62/140,004, filed Mar. 30, 2015, which is incorporated herein by reference.

INTRODUCTION

The security of user input on many computing devices, such as personal computers, is important in many scenarios such as online banking. Computing devices can vulnerable to multiple threat vectors, such as malware, which may attempt to intercept or capture sensitive data input by the user in these scenarios.

Malware is a term used to describe a variety of hostile or intrusive software. Generally, malware is software used or created by attackers to disrupt computer operation, gather sensitive information, or gain access to private computer systems. It can appear in the form of computer code, scripts, active content, or other software. The threat of malware is continuously increasing, as malware itself becomes more sophisticated, and the range of malicious purposes expands.

In response, many software-based solutions have been developed to combat the threat of malware and to attempt to secure the personal computing devices of users. Generally, these conventional software-based solutions attempt to protect data within the computing device itself by blocking the activity of malware, or by removing the malware. Some software-based solutions attempt to safeguard sensitive data through encryption and various software-enforced schemes intended to prevent access to the sensitive data. However, if a computing device is already infected with malware, a software-based solution may be incapable of adequately safeguarding sensitive data. For instance, if malware is able to intercept raw data from a peripheral device, a software-based anti-malware solution that operates in a web browser may not provide an effective safeguard for the user's sensitive data.

DRAWINGS

For a better understanding of the various embodiments described herein, and to show more clearly how they may be carried into effect, reference will now be made, by way of example only, to the accompanying drawings which show at least one exemplary embodiment, and in which.

Figure 1:
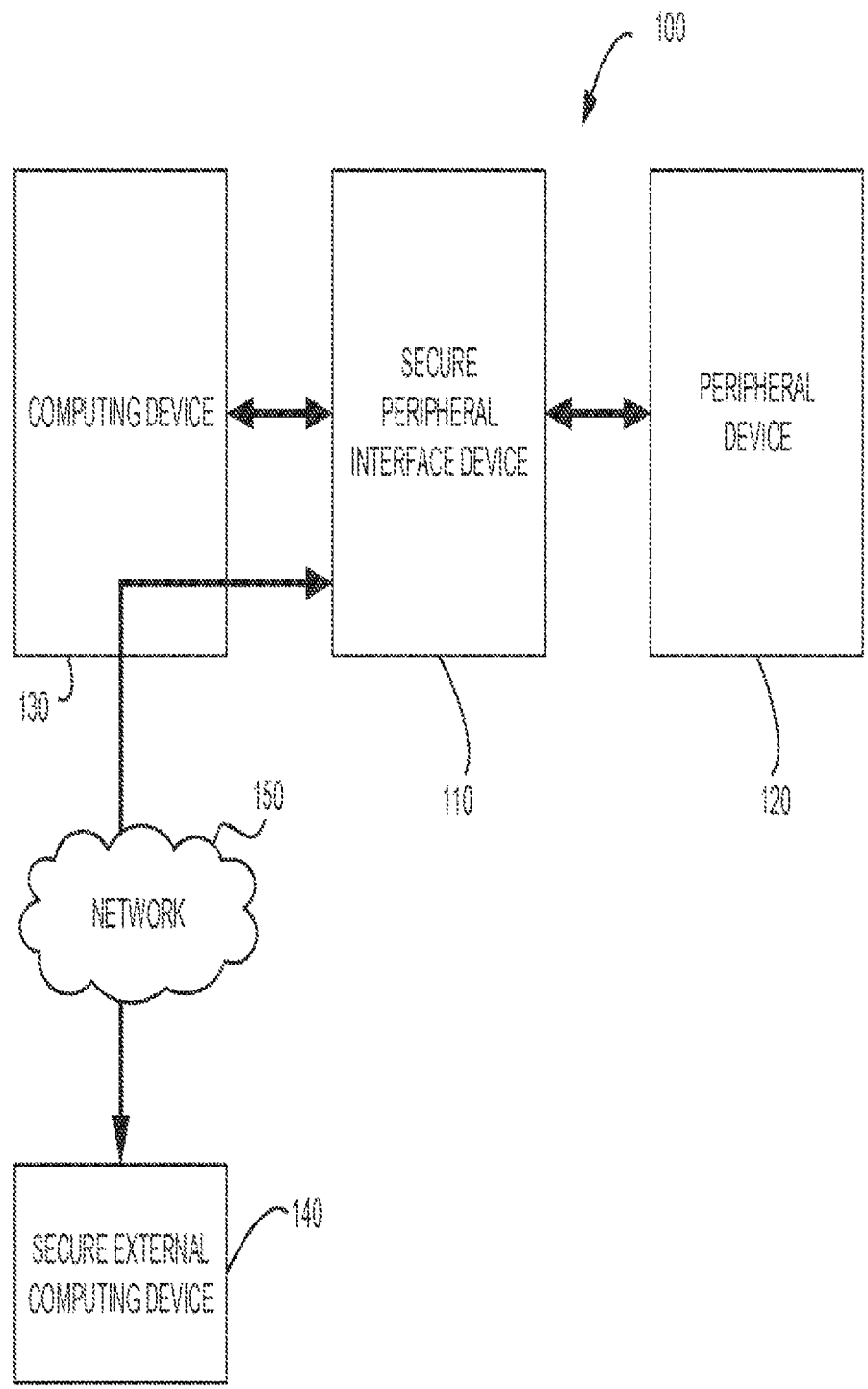
FIG. 1 is a simplified block diagram of an example system in accordance with some embodiments.

The skilled person in the art will understand that the drawings, described below, are for illustration purposes only. The drawings are not intended to limit the scope of the applicants' teachings in any way. Further, where considered appropriate, reference numerals may be repeated among the figures to indicate corresponding or analogous elements.

DESCRIPTION OF VARIOUS EMBODIMENTS

The embodiments of the systems and methods described herein may be implemented in hardware or software, or a combination of both. These embodiments may be implemented in computer programs executing on programmable computers, each computer including at least one processor, a data storage system (including volatile memory, non-volatile memory, other data storage elements or a combination thereof), and at least one communication interface.

Program code is applied to input data to perform the functions described herein and to generate output information. The output information is applied to one or more output devices.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer useable instructions may also be in various forms, including compiled and non-compiled code.

The described systems, methods, and apparatus generally provide a secure peripheral interface device (e.g., hub) that protects or secures sensitive data input from a peripheral device to a personal computing device before the input is received by the personal computing device, thus preventing access to the sensitive data by any malware that may infect the computing device.

In some embodiments, the secure peripheral interface device is a Universal Serial Bus (USB) hub, although in other embodiments the secure peripheral interface device supports other peripheral connection protocols, such as Thunderbolt™ or the Apple Lightning™ interface. The secure peripheral interface device may be an external device to the computing device. However, in some embodiments, the secure peripheral interface device may be provided within the enclosure or on the logic board of a computing device, in which case it is a physically distinct integrated circuit from the main processor and memory of the computing device. In particular, the secure peripheral interface device may be an application specific integrated circuit (ASIC) or field programmable gate array (FPGA) including its own dedicated processor and memory.

Accordingly, the secure peripheral interface device minimizes the risks of malware interception of sensitive data input by a user to a peripheral device, such as a keyboard, of a computing device.

Referring now to FIG. 1, there is illustrated a simplified block diagram of an example system in accordance with some embodiments.

In the illustrated embodiment, system 100 includes a computing device 130, secure peripheral interface device (SPID) 110, a peripheral device 120, a secure external computing device 140, and a network 150.

Computing device 130 is a personal computing device such as a personal computer, tablet computer, or smartphone. Computing device 130 has a processor, memory (volatile, non-volatile, or both), and at least one communication interface for transmitting and receiving data from peripheral devices and other computing devices.

Secure external computing device 140 is a computing device such as a server computer. Secure external computing device 140 also has a processor, memory and at least one communication interface. In the secure communication contexts described herein, secure external computing device 140 is the destination for sensitive data input by a user of computing device 130. For example, secure external computing device 140 may be an online banking web server, a virtual private network server, or some other computing device that may receive sensitive data from the user.

Computing device 130 and secure external computing device 140 are communicatively coupled by a network 150. Network 150 is a data communications network, such as the Internet. In some embodiments, network 150 may be omitted and computing device 130 and external computing device 140 may be directly coupled, for example, via a data communications cable.

SPID 110 may include a processor, an internal memory and at least one communication interface, such as USB. SPID 110 may be an integrated microcontroller, for example. In the illustrated embodiment, SPID 110 is a USB hub implementing the USB 2.0 protocol. For clarity, SPID 110 is illustrated as a separate device, external to computing device 130. However, SPID 110 may be provided within the enclosure of computing device 130, as an FPGA or ASIC on a logic board, or the like.

SPID 110 can be implemented as a tamper-resistant device conforming to the GlobalPlatform™ Trusted Execution Environment Secure Element (SE) specifications. Accordingly, SPID 110 is generally capable of performing the functions associated with a Secure Element. Generally, a SE is a hardware-based device that provides tamper-resistance measures effective against software-based attacks, hardware-based attacks and side channel attacks, such as differential power analysis.

SPID 110 can operate in at least four different modes of operation—a normal mode, a sniffing mode, an obscuring mode and an encryption mode—as described with reference to FIGS. 2A to 2D. Accordingly, SPID 110 can accept control commands to switch between modes of operation. Control commands may originate from different sources, including a peripheral device, a computing device and a secure external computing device, as described with reference to FIG. 3.

In some circumstances, SPID 110 can store sensitive data to its internal memory for later retrieval and transmission, as described with reference to FIG. 4.

Referring to FIGS. 2A to 2D, SPID 110 is capable of operating in at least four different modes: normal mode 210, sniffing mode 220, obscuring mode 230, and encryption mode 240.

Figure 2A:
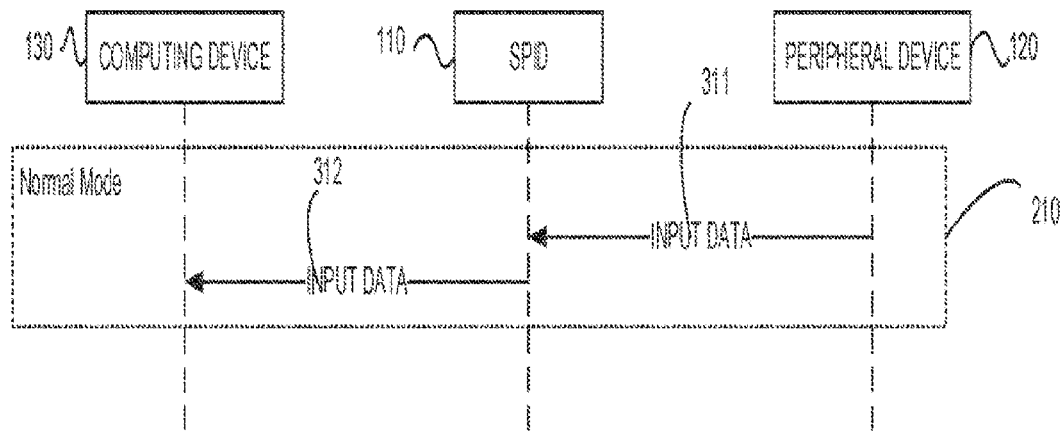
FIGS. 2A to 2D are data flow diagrams illustrating example modes of operation of a secure peripheral interface device in the system of FIG. 1.

Referring now to FIG. 2A, there is illustrated a data flow diagram for a normal mode 210. In a normal mode 210, SPID 110 operates in conventional fashion as a USB hub device, without applying security controls. Normal mode 210 may be a default mode of operation for SPID 110.

In normal mode 210, input data is received at a peripheral device and transmitted to SPID 110 at 311. At 312, the input data is transmitted from SPID 110 to computing device 130 in unmodified form.

Figure 2B:
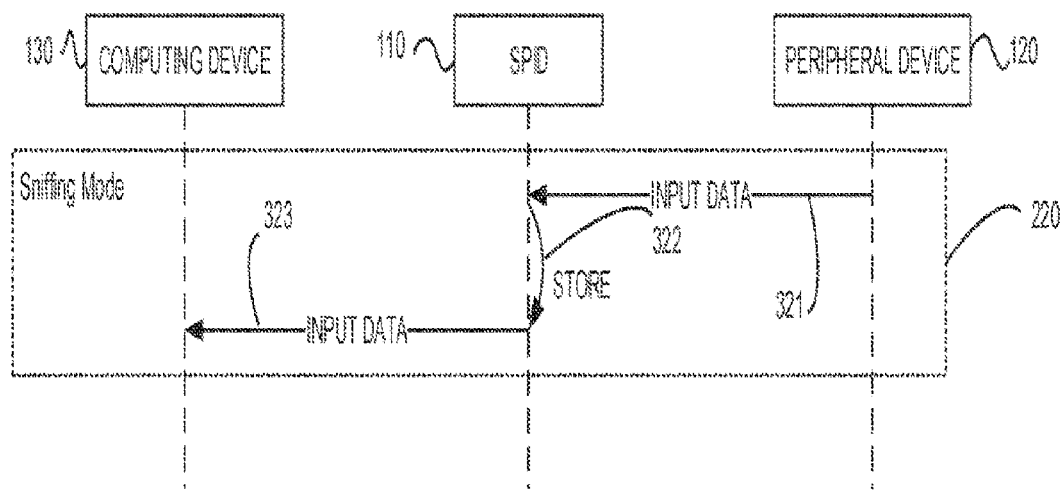

Referring now to FIG. 2B, there is illustrated a data flow diagram for a sniffing mode 220. In a sniffing mode 220, SPID 110 appears to operate in conventional fashion as a USB hub device. However, SPID 110 stores input for possible later retrieval.

In a sniffing mode 220, input is received at a peripheral device and transmitted to SPID 110 at 321. At 322, SPID 110 captures and stores unmodified input from peripheral device 120. Input data is stored securely in a memory of SPID 110, for example using Secure Element storage, for possible export and transmission to a secure external computing device 140, as described with reference to FIG. 4.

At 323, SPID 110 transmits the input data to computing device 130 in unmodified form.

Figure 2C:
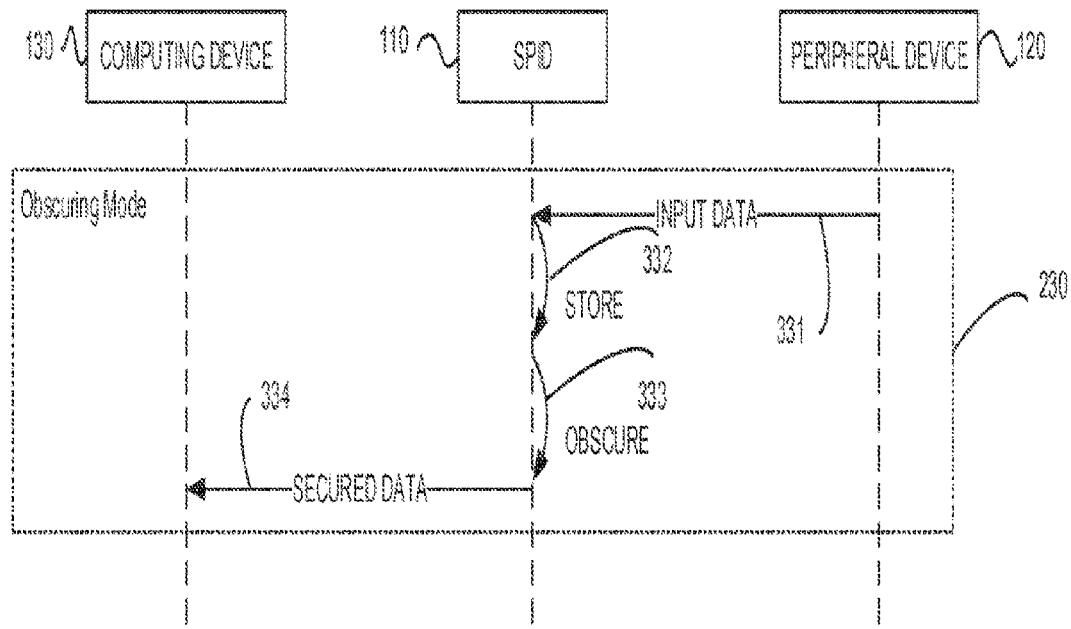

Referring now to FIG. 2C, there is illustrated a data flow diagram for an obscuring mode 230.

In an obscuring mode 230, SPID 110 captures all of the user input from peripheral device 120 and obscures sensitive data in the input data. For example, sensitive data may be obscured by replacing all or a portion of the input data with pre-defined "blanking" data, such as asterisk characters. In another example, sensitive data may be obscured by replacing the sensitive data with proxy data. Proxy data is non-sensitive data that may be generated by SPID 110 and associated with the sensitive data retained in memory.

Accordingly, in obscuring mode 230, input is received at a peripheral device and transmitted to SPID 110 at 331. At 332, SPID 110 captures and stores unmodified input from peripheral device 120. At 333, a processor of SPID 110 obscures the input data to generate secured input data, before transmitting the secured input data to computing device 130 at 334.

When SPID 110 operates in obscuring mode 230, input data from peripheral device 120 is first processed before transmission to computing device 130. That is, computing device 130 preferably does not receive the original, unmodified input data that was entered via peripheral device 120. Computing device 130 only receives the secured input data. The unmodified input data is stored securely in a memory of SPID 110 for possible export and transmission to a secure external computing device 140, as described with reference to FIG. 4.

Figure 2D:
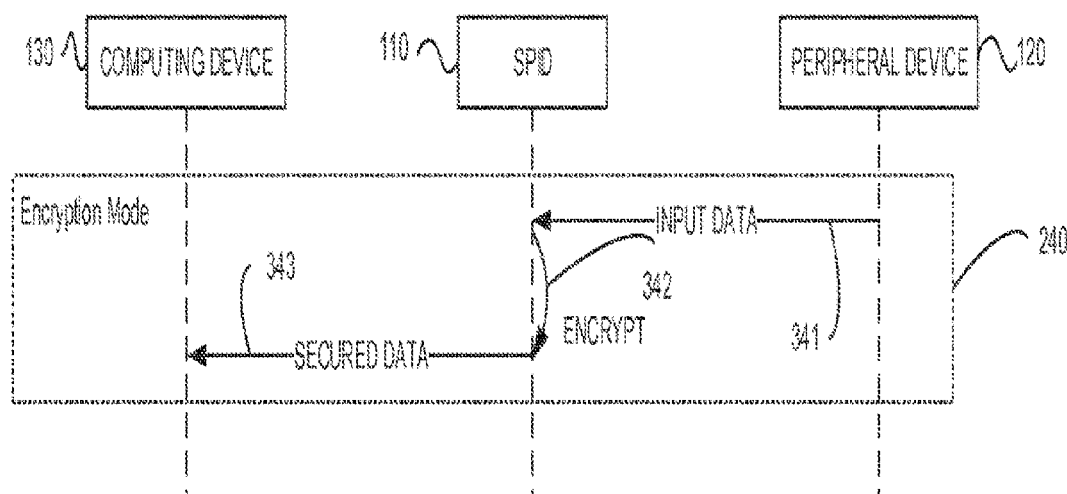

Referring now to FIG. 2D, there is illustrated a data flow diagram for an encryption mode 240. Encryption mode is generally similar to obscuring mode 230 of FIG. 2C. However, in encryption mode 240, SPID 110 encrypts input data rather than obscuring the input data.

In an encryption mode 240, SPID 110 encrypts all of the user input from peripheral device 120 and sends encrypted input to the computing device 130. In an encryption mode 240, computing device 130 never sees actual user input that was entered via peripheral device 120.

Accordingly, in encryption mode 240, input is received at a peripheral device and transmitted to SPID 110 at 341. At 342, a processor of SPID 110 encrypts the input data to generate secured input data. Optionally, SPID 110 may store the input data or secured input data for later retrieval.

At 343, SPID 110 transmits the secured input data to computing device 130, which may transmit the secured input data to another device, such as secure external computing device 140.

Accordingly, when SPID 110 operates in encryption mode 240, input data from peripheral device 120 is first processed and encrypted before transmission to computing device 130. That is, computing device 130 does not receive the original, unmodified input data that was entered via peripheral device 120. Computing device 130 only receives the encrypted, secured input data.

Figure 3A:
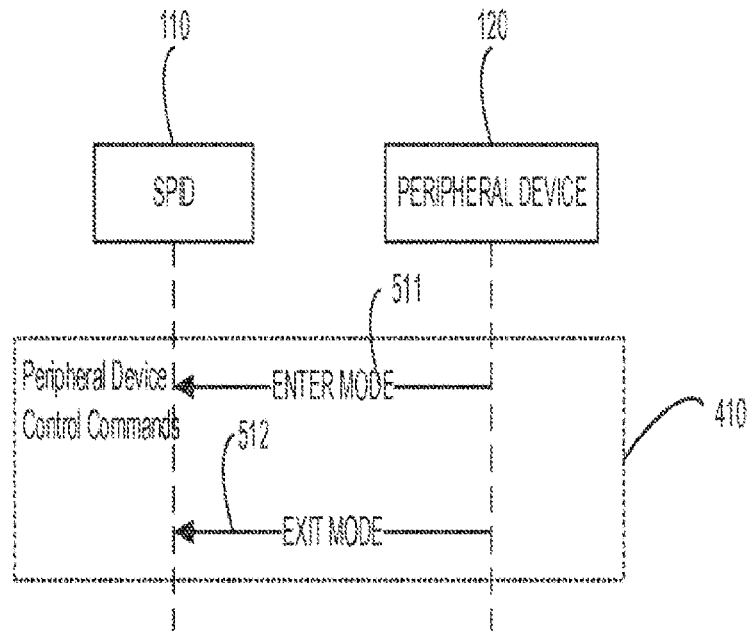
FIGS. 3A to 3C are example command flow diagrams for switching the mode of operation of a secure peripheral interface device in the system of FIG. 1.
Figure 3B:
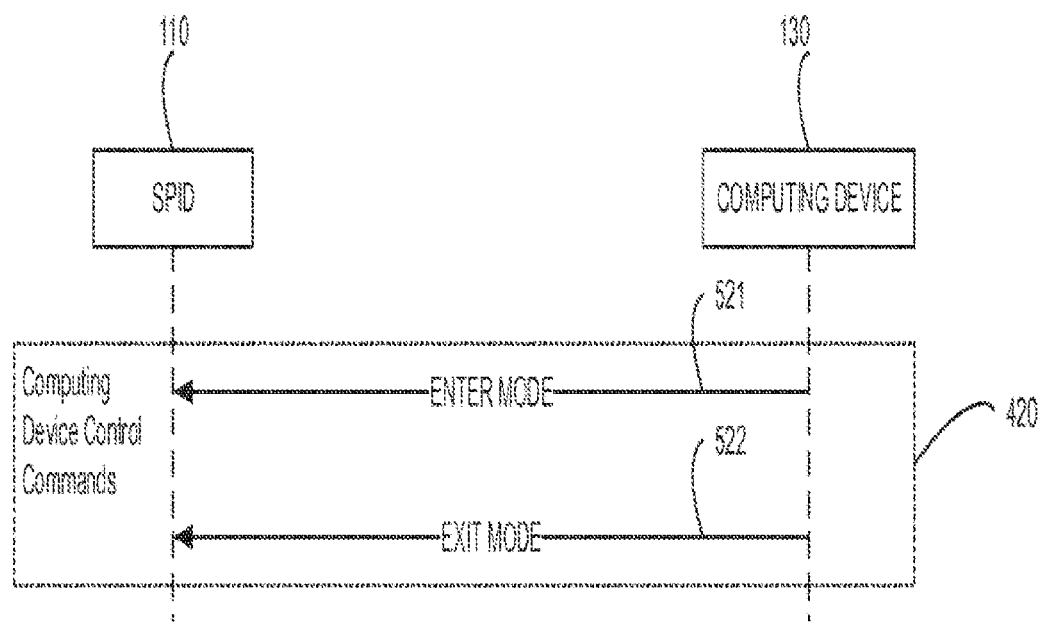
Figure 3C:
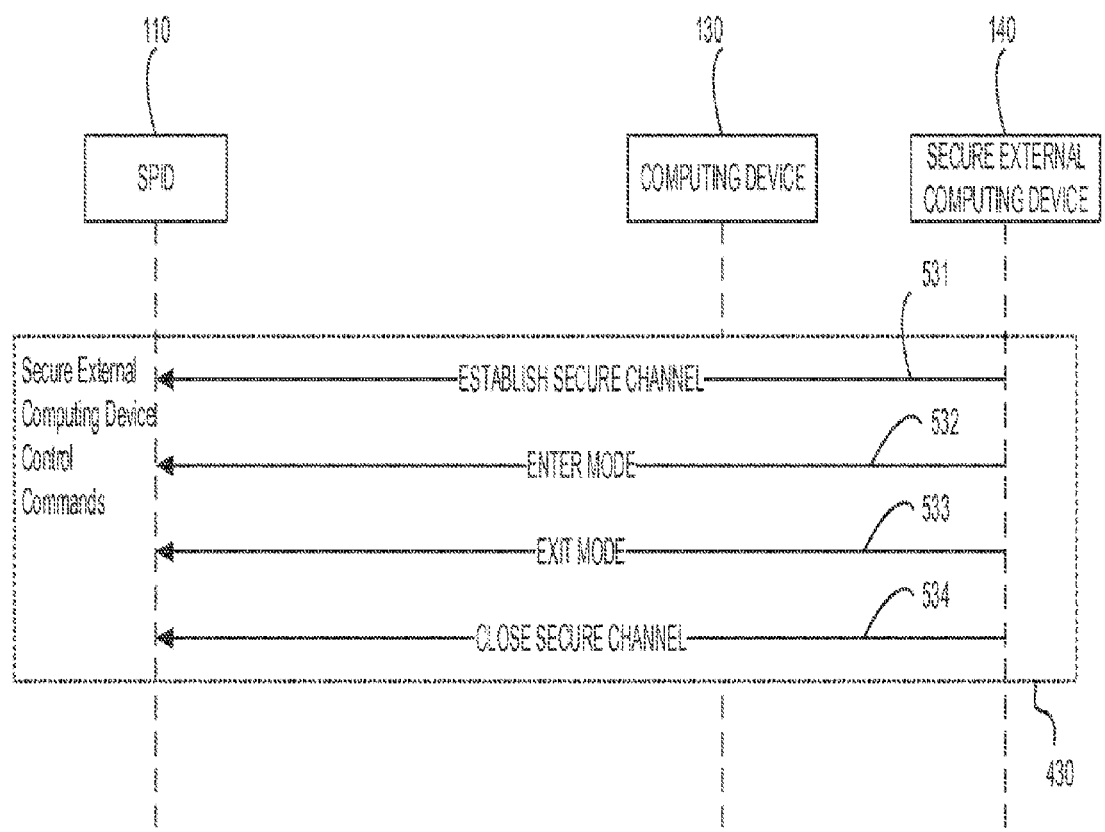

Referring now to FIGS. 3A to 3C, there are illustrated example command flow diagrams for switching the mode of operation of a SPID, such as SPID 110 of system 100.

SPID 110 can switch between different modes of operation in at least three different ways, making the process of securing sensitive data easier for the user.

Referring now to FIG. 3A in particular, there is illustrated a peripheral device command flow 410. In peripheral device command flow 410, SPID 110 may initially be operating in normal mode 210. When a user desires to secure data, a secure mode selection input may be provided at peripheral device 120, such as pressing a "secure" button on a keyboard. There may be several dedicated buttons to select the desired operation mode or, alternatively, a single button may be depressed multiple times to cycle through multiple operation modes.

In response to the selection input, peripheral device 120 sends an enter mode command to SPID 110, at 511. SPID 110 then enters the selected secured mode of operation.

When the entering of sensitive data has been completed, the user may once again provide an input at peripheral device 120 to exit from a secure mode. In response to the further selection input, peripheral device 120 transmits an exit mode command to SPID 110 at 512. Accordingly, SPID 110 enters normal mode 210.

Referring now to FIG. 3B in particular, there is illustrated a computing device command flow 420. Command flow 420 is generally analogous to command flow 410 of FIG. 3A, with computing device 130 taking the place of peripheral device 120.

In computing device command flow 420, SPID 110 may initially be operating in normal mode 210. A software program requesting a user's authentication credentials may determine that a secured data input entry is needed, and may generate an indication identifying the desired secured mode.

In response to the indication, computing device 130 transmits an enter mode command to SPID 110, at 521. SPID 110 then enters the selected secured mode of operation.

When the entering of sensitive data has been completed, the software program may provide a further indication to exit from a secure mode. In response to the further indication, computing device 130 transmits an exit mode command to SPID 110 at 522. Accordingly, SPID 110 enters normal mode 210.

Referring now to FIG. 3C in particular, there is illustrated a secure external computing device command flow 430.

In secure external computing device command flow 430, computing device 130 acts as a communication relay between SPID 110 and secure external computing device 140. SPID 110 may initially be operating in normal mode 210.

When secure external computing device 140 determines that a secured mode of data input should be used, the secure external computing device 140 may establish a secure channel with SPID 110 at 531, using Transport Layer Security (TLS) or another suitable encryption protocol. The secure channel is established via computing device 130. Each of secure external computing device 140 and SPID 110 control their respective endpoints of the secure channel and maintain their respective cryptographic keys. Accordingly, computing device 130 is unable to snoop or eavesdrop on communications in the secure channel.

Once the secure channel is established, secure external computing device 140 transmits an enter mode command to SPID 110, at 532. SPID 110 then enters the selected secured mode of operation.

While in the encryption mode, input data received at SPID 110 (e.g., from peripheral device 120) may be directly transmitted to secure external computing device 140. Secure external computing device 140 may receive the input data and store or process the input data as needed.

For example, in the context of an authentication process where the input data is a user password, secure external computing device may receive the password, verify that the password is correct and signal to computing device 130 that authentication was successful. The signal to computing device 130 may be transmitted out of band, that is, not within the secure channel established between SPID 110 and secure external computing device 140.

When the entering of sensitive data has been completed, secure external computing device 140 transmits an exit mode command to SPID 110 at 533. Accordingly, SPID 110 enters normal mode 210. The secure channel may be closed at 534.

Figure 4A:
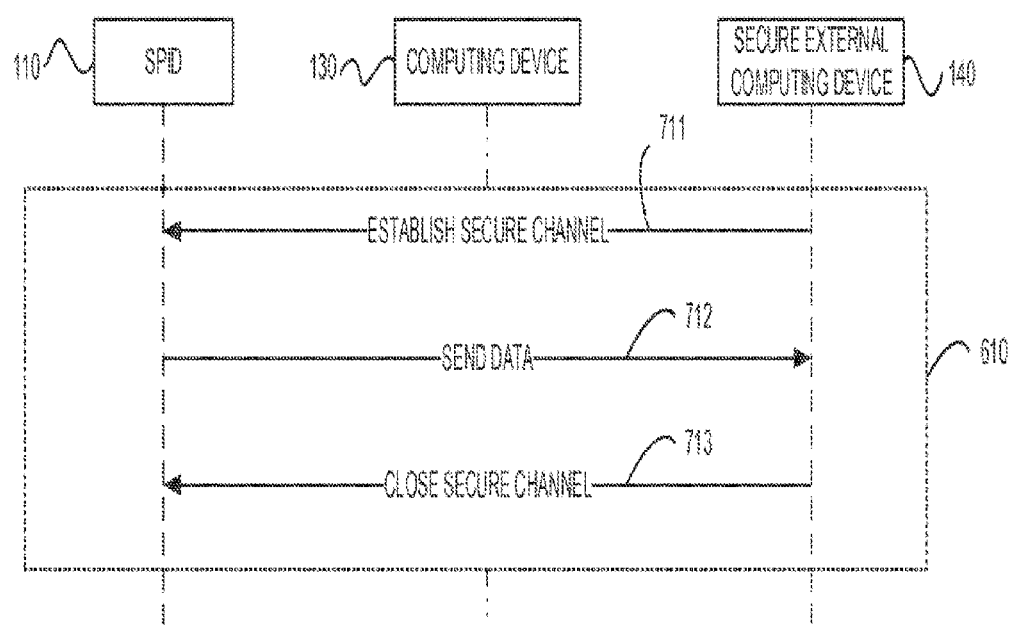
FIGS. 4A and 4B are example data flow diagrams for the transmission of input data by a secure peripheral interface device in the system of FIG. 1.
Figure 4B:
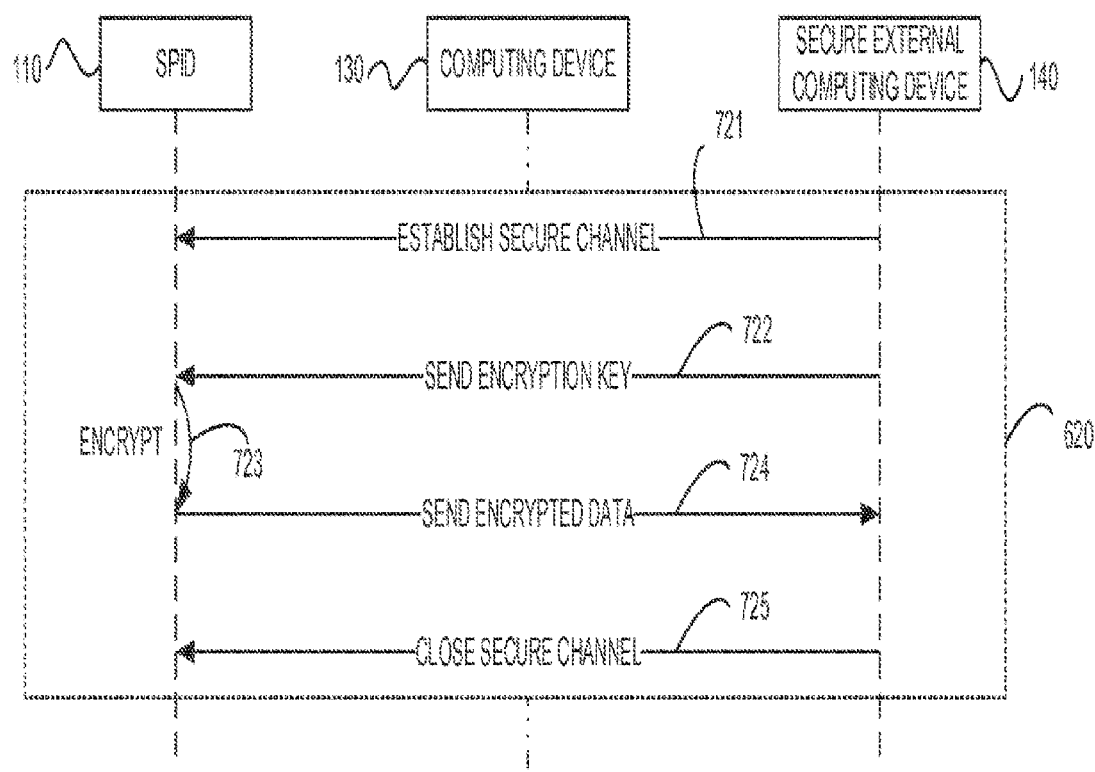

Referring now to FIGS. 4A and 4B, there are illustrated example data flow diagrams for the transmission of input data from the SPID 110 to a secure external computing device. The transmitted input data may be stored input data.

Referring now to FIG. 4A in particular, there is illustrated a data flow 610.

At 711, secure external computing device 140 establishes a secure channel with SPID 110, for example as described with reference to FIG. 3C.

Upon establishment of the secure channel and obscuring mode of operation, SPID transmits the stored input data to secure external computing device 140, at 712.

Once the transmission of the input data is complete, the secured mode of operation may be exited and the secure channel closed at 713.

Referring now to FIG. 4B in particular, there is illustrated a data flow 620, which is generally similar to data flow 610 of FIG. 4A. Data flow 620 introduces an additional layer of encryption, for added security.

At 721, secure external computing device 140 establishes a secure channel with SPID 110, for example as described herein with reference to FIG. 3C.

At 722, secure external computing device 140 generates and transmits a shared cryptographic key, such as a symmetric encryption key, to SPID 110 for use during the secure channel session. Alternatively, SPID 110 may generate and transmit the shared cryptographic key to secure external computing device 140.

SPID 110 encrypts the stored input data using the shared cryptographic key at 723, and transmits the encrypted data to secure external computing device 140, at 724.

The secure channel may be closed at 725.

Figure 5:
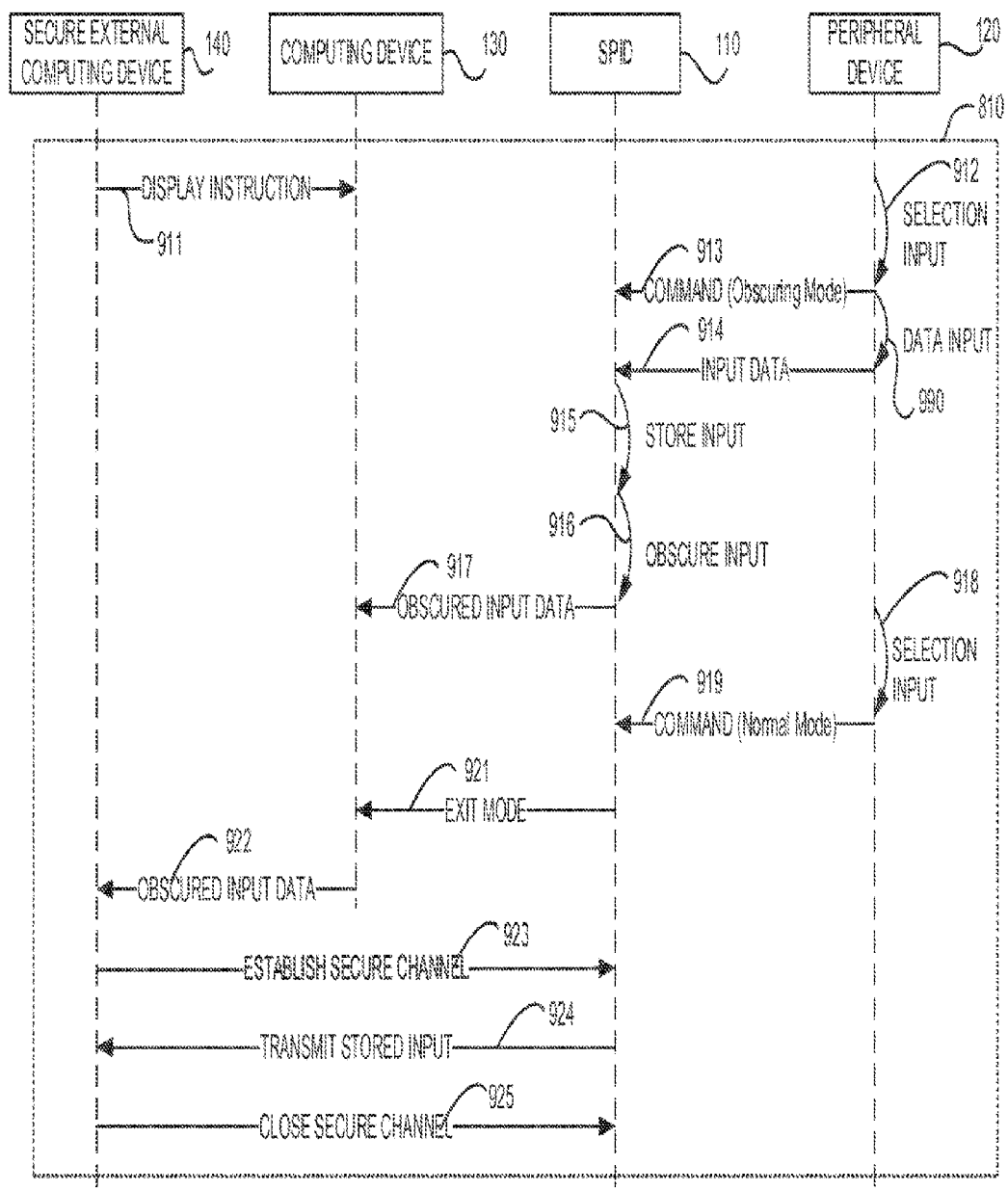
FIG. 5 is an example data flow diagram for the system of FIG. 1.

Referring now to FIG. 5, there is illustrated a data flow diagram for an example system, such as system 100 of FIG. 1.

In the example of data flow 810, secure external computing device 140 may be an online banking website and the input data may be a user password for authenticating the user with the online banking website.

A user may initially connect to secure external computing device 140 using a web browser at computing device 130. Upon login, secure external computing device 140 transmits an indication to computing device 130 at 911, causing computing device 130 to display an instruction to the user to initiate an obscuring mode of operation at SPID 110.

In response, the user provides a selection input to peripheral device 120, selecting the obscuring mode of operation. For example, the selection input may comprise one or more key presses of a keyboard, as described herein.

Peripheral device 120 transmits a command to SPID 110 to enter the obscuring mode at 913.

Once the obscuring mode is activated, the user enters that password at 990, which is transmitted to SPID 110 by peripheral device 120 at 914.

SPID 110 stores the input data at 915, and obscures the input data at 916 to generate secured input data.

At 917, the obscured input data is transmitted to computing device 130, where it can be stored for later transmission, and may be displayed to the user on a display of computing device 130.

Upon completing entry of the password, the user may provide a further selection input to return to the normal mode of operation, at 918. Accordingly, peripheral device 120 transmits a command to SPID 110 to enter the normal mode of operation at 919.

SPID 110 may further transmit an indication to computing device 130 that the obscuring mode has been exited at 921, signifying that the password entry is complete. Optionally, a separate indication may be used (e.g., the user may click a "Submit Button" in the web browser) to indicate to computing device 130 that the data input (e.g., password) has been completed.

Computing device 130 transmits login information to secure external computing device 140 at 922. The login information may include the obscured input data, or it may include an indication that the password has been stored at SPID 110.

In response, secure external computing device 140 detects that obscured input data has been provided in lieu of the user's password, or that the indication has been received that the password is stored at SPID 110, and establishes a secure channel with SPID 110 at 923.

SPID 110 transmits the stored input data at 924, as described herein. The secure channel may be closed at 925.

Accordingly, sensitive input data, such as the user password, is only sent in encrypted form, end-to-end between SPID 110 and secure external computing device 140. Malware that may be present on computing device 130 is not provided with an unobscured or unencrypted form of the input data.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein. The scope of the claims should not be limited by the preferred embodiments and examples, but should be given the broadest interpretation consistent with the description as a whole.

The invention claimed is:

1. A method of securing input data from a peripheral device for transmission to a secure external computing device, comprising:
    displaying, at a personal computing device, a request for user input;
    receiving, at a user interface of the peripheral device, input data from a user, wherein the input data is associated with the request for user input;
    receiving, at the peripheral device, a secure mode selection of one of a plurality of secure modes for securing input data, the plurality of secure modes for securing input data including at least two of an encryption mode, an obscuring mode and a sniffing mode;
    transmitting the input data and the secure mode selection from the peripheral device to a secure element, wherein the secure element is in communication with the peripheral device and the personal computing device via at least one communication interface that directly couples the secure element to the peripheral device and the personal computing device;
    selecting, at the secure element, one of the plurality of secure modes for securing input data based on the secure mode selection;
    securing, at the secure element, the input data based on the selected one of the plurality of secure modes;
    storing the secured input data in a memory of the secure element;
    transmitting the secured input data from the secure element to the personal computing device via the at least one communication interface;
    transmitting the secured input data from the personal computing device to the secure external computing device via a communication network; and
    wherein operations performed by the secure element are protected by tamper resistance measures to secure against one or more of software-based attacks, hardware-based attacks, and side channel attacks.

2. The method of claim 1, wherein the input data comprises authentication data.

3. The method of claim 1, wherein the plurality of secure modes comprise a sniffing mode, an encryption mode and an obscuring mode.

4. The method of claim 1, further comprising establishing a secure channel between the secure element and the secure external computing device prior to transmitting the secured input data from the secure element.

5. An interface device comprising:
    at least one communication interface directly coupled to a plurality of devices to communicate with the plurality of devices, wherein a first device of the plurality of devices includes a user interface; and
    a secure element directly coupled to the at least one communication interface,
    the secure element comprising:
        a memory;
        a processor configured to receive input data provided by a user to the user interface and a secure mode selection of one of a plurality of secure modes for securing input data from one or more of the plurality of devices via the at least one communication interface, the plurality of secure modes for securing input data including at least two of an encryption mode, an obscuring mode and a sniffing mode, wherein the processor is configured to select one of the plurality of secure modes for securing input data based on the secure mode selection, secure the input data based on the selected one of the plurality of secure modes, and store the secured input data in the memory; and wherein operations performed by the secure element are protected by tamper resistance measures to secure against one or more of software-based attacks, hardware-based attacks, and side channel attacks.

6. The interface device of claim 5, wherein, based on the secure mode being the encryption mode, the processor is configured to encrypt the input data with an encryption key, store the encrypted data as the secured input data, and transmit the encrypted data to a secure external computing device via a communication network.

7. The interface device of claim 5, wherein, based on the secure mode selection being the obscuring mode, the processor is configured obscure the input data, transmit the obscured data to a computing device, and store the input data as the secured input data.

8. The interface device of claim 7, wherein the processor is configured to establish a secure channel with a secure external computing device via a communication network and transmit the secured input data to the secure external computing device via the secure channel.

9. The interface device of claim 5, wherein the processor is configured, based on the secure mode being the sniffing mode, to store the input data as the secured input data, establish a secure channel with a secure external computing device via a communication network, and transmit the secured input data to the secure external computing device via the secure channel.

10. The interface device of claim 5, wherein the input data comprises information for authenticating a user.

11. The interface device of claim 10, wherein the information for authenticating the user comprises a user password.

12. The interface device of claim 5, wherein the first device comprises a peripheral device.

13. A method of securing input data from a user at an interface device, comprising:

receiving, at a secure element, the input data and a secure mode selection of one of a plurality of secure modes for securing input data from at least one device via one or more communication interfaces, the plurality of secure modes for securing input data including at least two of an encryption mode, an obscuring mode and a sniffing mode, wherein the one or more communication interfaces directly couple the secure element to the at least one device, and wherein the at least one device includes a user interface to receive the input data from the user;

selecting, at a secure element, one of the plurality of secure modes for securing input data based on the secure mode selection;

securing, at the secure element, the input data based on the selected one of the plurality of secure modes; and wherein operations performed by the secure element are protected by tamper resistance measures to secure against one or more of software-based attacks, hardware-based attacks, and side channel attacks.

14. The method of claim 13, wherein securing the input data based on the selected one of the plurality of secure modes comprises:

encrypting the input data with an encryption key based on the secure mode being the encryption mode;

storing the encrypted data in a memory of the secured element; and transmitting the encrypted data to a secure external computing device via a communication network.

15. The method of claim 13, wherein securing the input data based on the selected one of the plurality of secure modes comprises:

obscuring the input data based on the secure mode being the obscuring mode;

storing the input data in a memory of the secured element; and transmitting the obscured data to a computing device via the one or more communication interfaces.

16. The method of claim 15, further comprising:

establishing a secure channel with a secure external computing device via a communication network; and transmitting the input data to the secure external computing device via the secure channel.

17. The method of claim 13, wherein securing the input data based on the selected one of the plurality of secure modes comprises:

storing the input data in a memory of the secure element based on the secure mode being the sniffing mode;

establishing a secure channel with a secure external computing device via a communication device; and transmitting the input data to the secure external computing device via the secure channel.

18. The method of claim 13, wherein the input data comprises information for authenticating a user.

19. The method of claim 18, wherein the information for authenticating the user comprises a user password.

20. The method of claim 13, wherein the input data is received from a peripheral device.

21. The method of claim 1, wherein the direct coupling of the at least one communication interface comprises at least one direct physical connection.

22. The interface device of claim 5, wherein the direct coupling of the secure element to the plurality of devices comprises at least one direct physical connection.

23. The method of claim 13, wherein the direct coupling of the secure element to the device comprises one or more direct physical connections.

* * * * *